Dec. 9, 1952     F. S. WHITMARSH     2,621,068
TONGS FOR STRINGLESS TEA BAGS
Filed July 11, 1947
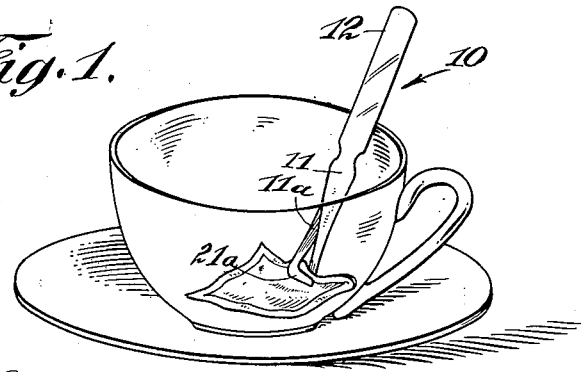
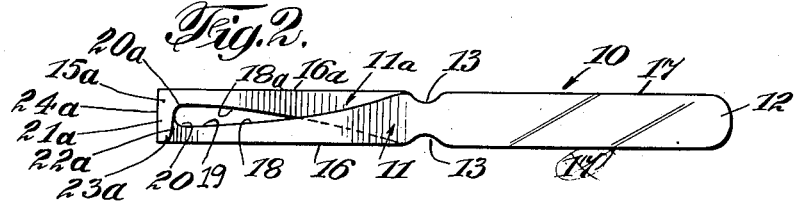
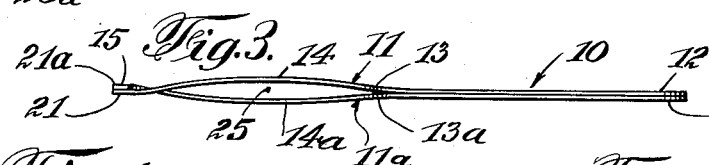
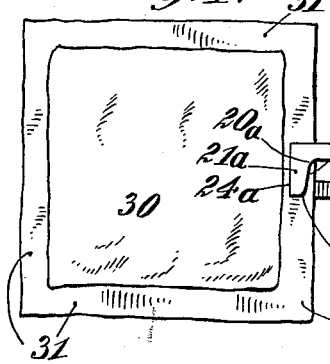 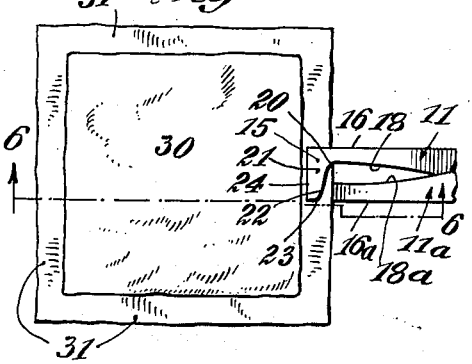
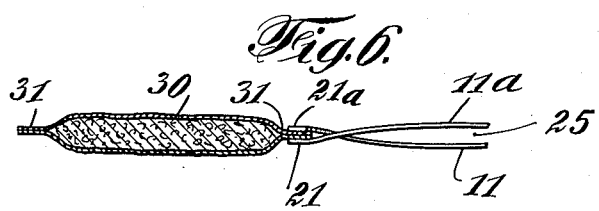
INVENTOR.
Fred S. Whitmarsh
BY
C. P. Goepel
his ATTORNEY

UNITED STATES PATENT OFFICE 2,621,068

TONGS FOR STRINGLESS TEA BAGS

Fred S. Whitmarsh, Jackson Heights, N. Y.

Application July 11, 1947, Serial No. 760,187

1 Claim. (Cl. 294—99)

This invention relates to tongs for stringless tea bags. The object of the invention is to provide a means which will secure a secure grip on the overlapping marginal edges of a tea bag, so that when the bag has once been gripped, it may be manipulated in any position.

The invention consists of a pair of spring tongs, the ends of which are arranged transversely to the longitudinal length of the tongs, one such end being on each tong member, with one end extending in a direction opposite to the direction of the other end, and both ends being of the same length and overlapping and registering one with the other, with the adjacent surfaces in a common plane.

The invention will be further described, an embodiment shown in the drawings, and the invention will be finally pointed out in the claim.

In the accompanying drawings,

Fig. 1 is a perspective view showing the application of the improved tong;

Fig. 2 is a plan view of the improved tong;

Fig. 3 is a side view of the same;

Fig. 4 is a top plan view of the jaw members of the tong applied to a tea bag;

Fig. 5 is a bottom plan of Fig. 4; and

Fig. 6 is a section taken on line 6—6 of Fig. 5.

Similar characters or reference indicate corresponding parts throughout the various views.

Referring to the drawings, the improved tong 10 consists of two superposed members 11 and 11a of identical contour, but placed one in reverse position to the other. Each member is made of one piece, with a handle portion 12 or 12a, and each handle portion has a curved marginal cutout 13 or 13a, a sprung out portion 14 or 14a, and a jaw portion 15 or 15a. One edge 16 of each member is substantially straight and aligned with the straight edge 17 of the handle portion 12, and the other edge 18 of each member is along a straight, or curved, inclined line 19 terminating in a fillet 20. A transverse pressure member 21 or 21a has one edge 22 merging with the fillet 20, and curves at 23, 23a, to the edge 24, 24a which is straight, which forms a right angle with the side edge 16. The sprung portion extends from the pressure member 21 or 21a to about the cutouts 13 or 13a, and are spaced apart, as indicated by the elongated or lentil like space 25.

The sprung portion is such that one longitudinal member 10 has its pressure member 21 or 21a extend below the pressure member of the other longitudinal member 11 or 11a, and the normal tension of these members 11 and 11a is such as to press the pressure members 21 and 21a tightly against each other. The opposed faces of the pressure members 21 and 21a are flat, and in a common contacting plane. The width of each pressure member 21, 21a, equal to the width of the other, and is about three eighths of an inch (⅜).

By pressing against the sprung parts of the members 11 and 11a, the pressure members separate from each other, but immediately such pressure is released, the pressure members 21, 21a, again contact and press against each other.

Tea bags containing tea are distributed with strings or without strings. Such bags are made of a mesh like cloth or paper by two superposed sheets, usually of square shape, and these have their marginal edges joined. The overlapping edges thus contact in a common plane.

The pressure members 21, 21a, constructed in the manner described grip these overlapping marginal edges and obtain a secure hold on them.

It is intended that when the user takes a fresh bag, the edges of the pressure members 21, 21a, are gripped thereto, when the bag with the improved tong attached thereto is inserted into the boiling water in the tea cup or by pouring boiling water over the tea bag when in the cup. The tong is allowed to rest against the side of the cup during brewing; and then the bag may be removed from the cup with the tong attached. Also, the bag may be pressed by the tong against the cup wall or tea spoon for more thorough exuding of the liquid contents, the bag being temporarily, in effect, a part of the tong.

The improved tong is especially intended for use with stringless bags, but may be used with string tags, as many find that the looseness of the string fails to give satisfaction. The tea bag may be "dunked," swished or pressed in the cup.

The preferred dimensions are 4½ in. for the overall length, the handle portion of 2¼ in. and the sprung portion with jaws 2 in., with the cutout formed by a curvature of ⅛ in. These dimensions may be varied to suit cup, pot or glass brewing methods.

The improved tong facilitates the handling of the stringless tagless tea bag (tea ball), in the cup, pot, or glass during the period of brewing, and is an aid in the removal and disposal of same after use. The sides of the tong may be provided with advertising matter.

The small pair of reverse pressure members require only finger pressure upon the sprung portions to open the same. On release of such pressure, they hold the tea bag firmly, and have all the advantages in handling, as a tag and string.

The tong may be made of spring steel, the parallel handle portions may be joined by spot welding. The tong may be chrome plated, nickeled, silver plated, or otherwise protected from giving a foreign taste to the tea. It can be made from stainless spring steel, monel spring steel, or other non-corrosive metal. Can also be manufactured with plastic handles in colors. A third method would be to make the tong of plastic, by either the compression or injection method. This plastic must be tasteless and odorless, and have certain properties in order to withstand boiling water, without warping or becoming soft.

In Figs. 4, 5 and 6, the gripping pressure members are shown as applied to a tea bag 30 having the marginal rim 31.

It has been found that ordinary pinchers, when used with tea bags, permit wobbling of the bag and also frequently puncture the bag. The use of the tea bag margin fitting pressure members, each of elongated form and overlapping, in reverse form, avoid the objections, and provide an efficient means of answering the requirements in the use of tea bags.

The pressure members may be provided with knurls to prevent slipping of the bag from the tong. This is particularly important when the tong is made of longer length for larger sized tea bags, sometimes one or two ounces, and used mainly for the making of iced tea in hotels or restaurants, the handle of the tong then extending above the rim of the jar or pitcher or hotel sized tea pot.

I have described an embodiment of my invention, but obviously various changes may be made in the details disclosed without departing from the spirit of the invention as set out in the following claim.

I claim:

In a tea tong for tea bags, the combination of superposed contacting members forming a handle at one of their ends, each of said members having a longitudinal bow shaped extension, each spaced from the other to form a lentil like space between the same, and each having at its end distant from the connected ends a pressure portion, including a narrow leg extending at right angles to said extension member, the end of one leg terminating at the marginal edge of the other leg, and each leg having a marginal straight edge portion at right angles to said extension member, and each leg having a flat surface contacting the other in a common plane with the top surface of one engaging the undersurface of the other, under the inherent resiliency of the bow shaped extension members, each extension having a straight line outer margin and a curved inner margin, the two inner curved margins forming a longitudinal space for the passage of liquid between the bow shaped extensions, and said legs being adapted to engage the marginal overlapping portions of a tea bag with one leg at each side of said marginal portion, and each of said straight edge portions being parallel with the marginal edge of the tea bag, the opposed surfaces of said legs being parallel with the plane of the marginal portion of the tea bag, pressure on the bow shaped extensions separating the legs from each other, and on release of said pressure, the legs contact with, and hold the tea bag by gripping its marginal portion.

FRED S. WHITMARSH.

REFERENCES CITED

The following references are of record in the file of this patent:

UNITED STATES PATENTS

| Number | Name | Date |
| --- | --- | --- |
| 274,695 | Badger | May 27, 1883 |
| 450,266 | Truax | Apr. 14, 1891 |
| 1,025,362 | Beuoy | May 7, 1912 |
| 1,634,856 | Skroch | July 5, 1927 |